(12) United States Patent
Ruan et al.

(10) Patent No.: US 12,298,124 B2
(45) Date of Patent: May 13, 2025

(54) METHOD AND DEVICE FOR IMPROVING THE STABILITY OF HEIGHT DIFFERENCE MEASUREMENT BASED ON CORRUGATED TUBE

(71) Applicant: GUANGDONG RUNYU SENSOR CO., LTD, Guangdong (CN)

(72) Inventors: Bingquan Ruan, Guangdong (CN); Jialing Liang, Guangdong (CN); Xiaoyi Huang, Guangdong (CN)

( * ) Notice: Subject to any disclaimer, the term of this patent is extended or adjusted under 35 U.S.C. 154(b) by 0 days.

(21) Appl. No.: 18/863,633

(22) PCT Filed: May 10, 2024

(86) PCT No.: PCT/CN2024/092112
§ 371 (c)(1),
(2) Date: Nov. 6, 2024

(87) PCT Pub. No.: WO2024/239973
PCT Pub. Date: Nov. 28, 2024

(65) Prior Publication Data
US 2025/0109937 A1 Apr. 3, 2025

(30) Foreign Application Priority Data
May 25, 2023 (CN) .......................... 202310594936.0

(51) Int. Cl.
*G01B 13/06* (2006.01)
*G01C 5/04* (2006.01)

(52) U.S. Cl.
CPC ............ *G01B 13/065* (2013.01); *G01C 5/04* (2013.01)

(58) Field of Classification Search
CPC ................................ G01B 13/065; G01C 5/04
(Continued)

(56) References Cited

U.S. PATENT DOCUMENTS 3,132,428 A * 5/1964 Haissig ..................... G01C 5/04
251/207
4,434,561 A * 3/1984 Gaspar ..................... G01C 5/04
33/367
(Continued)

FOREIGN PATENT DOCUMENTS

CN  107907078 A   4/2018
CN  211926939 U   11/2020
(Continued)

*Primary Examiner* — George B Bennett

(57) ABSTRACT

The invention relates to the field of height measurement, disclosing a method and a device for improving the stability of height difference measurement based on a corrugated tube. The method comprises: improving the structural stability of a height difference measuring device between a first pressure sensor and a second pressure sensor, obtaining the structural stability improvement result; collecting a first pressure from the first pressure sensor, detecting whether the first pressure is affected by external interference; when the first pressure is not affected by external interference, performing pressure screening on the first pressure to obtain a screening pressure, and calculating a first pressure average value of the screening pressure; collecting a second pressure from the second pressure sensor, calculating a second pressure average value of the second pressure; based on a historical pressure average value of the second pressure sensor, detecting the pressure accuracy of the second pressure average value; when the pressure accuracy is accurate, updating the second pressure by utilizing the second pressure average value to obtain an updated pressure; calculating the dynamic height difference of the height difference measuring device, utilizing the dynamic height difference to determine a dynamic stability improvement result of the height difference measuring device. The invention can ensure the stability of pressure measurement.

9 Claims, 6 Drawing Sheets

(58) Field of Classification Search
USPC .................................................. 33/785, 786
See application file for complete search history.

(56) References Cited

U.S. PATENT DOCUMENTS

| | | | | |
|---|---|---|---|---|
| 4,991,302 | A * | 2/1991 | Brewer | G01C 5/04 33/367 |
| 5,101,571 | A * | 4/1992 | Bertoti | G01C 5/04 33/367 |
| 7,240,550 | B2 * | 7/2007 | Raffalt | G01V 7/04 73/314 |
| 9,995,579 | B2 * | 6/2018 | Boudin | G01C 5/04 |
| 10,488,843 | B2 * | 11/2019 | Vesco | G05B 19/401 |
| 10,495,532 | B2 * | 12/2019 | Lee | G01C 9/22 |
| 11,428,595 | B2 * | 8/2022 | Hinderling | G01L 15/00 |
| 12,202,580 | B2 * | 1/2025 | Tauriac | G01C 13/002 |
| 2022/0192031 | A1 * | 6/2022 | Falcon | H05K 13/0465 |
| 2022/0316873 | A1 * | 10/2022 | Scott | G01C 5/06 |

FOREIGN PATENT DOCUMENTS

| | | |
|---|---|---|
| CN | 116337006 A | 6/2023 |
| FR | 2842900 A1 | 1/2004 |

\* cited by examiner

```
┌─────────────────────────────────────────────┐
│ Utilizing the preset corrugated tube to improve the structural │
│ stability of a height difference measuring device between a    │
│ first pressure sensor and a second pressure sensor, obtaining  │
│ the structural stability improvement result.                    │
└─────────────────────────────────────────────┘ — S1
                      ↓
┌─────────────────────────────────────────────┐
│ Collecting a first pressure from the first pressure sensor,    │
│ detecting whether the first pressure is affected by external   │
│ interference; when the first pressure is not affected by external │
│ interference, performing pressure screening on the first       │
│ pressure to obtain a screening pressure, and calculating a first│
│ pressure average value of the screening pressure.              │
└─────────────────────────────────────────────┘ — S2
                      ↓
┌─────────────────────────────────────────────┐
│ Collecting a second pressure from the second pressure sensor,  │
│ calculating a second pressure average value of the second      │
│ pressure; based on a historical pressure average value of the  │
│ second pressure sensor, detecting the pressure accuracy of the │
│ second pressure average value; when the pressure accuracy is   │
│ accurate, updating the second pressure by utilizing the second │
│ pressure average value to obtain an updated pressure.          │
└─────────────────────────────────────────────┘ — S3
                      ↓
┌─────────────────────────────────────────────┐
│ Based on the first pressure average value and the updated      │
│ pressure, calculating the dynamic height difference of the     │
│ height difference measuring device, utilizing the dynamic      │
│ height difference to determine a dynamic stability             │
│ improvement result of the height difference measuring device.  │
└─────────────────────────────────────────────┘ — S4
                      ↓
┌─────────────────────────────────────────────┐
│ Combining the structural stability improvement result with the │
│ dynamic stability improvement result to determine the final    │
│ stability improvement result of the height difference          │
│ measurement device.                                             │
└─────────────────────────────────────────────┘ — S5
```

FIG. 1

METHOD AND DEVICE FOR IMPROVING THE STABILITY OF HEIGHT DIFFERENCE MEASUREMENT BASED ON CORRUGATED TUBE

TECHNICAL FIELD

The invention relates to the field of height measurement, and in particular to a method and a device for improving the stability of height difference measurement based on a corrugated tube.

BACKGROUND ART

Improving the stability of height difference measurement based on the corrugated tube refers to the process of compensating the pressure measurement deviation of the pressure sensor through the expansion and contraction transformation characteristics of the corrugated tube, and then screening the measured pressure to ensure the accuracy of the height difference finally obtained through pressure calculation.

The current height difference measurement product comprises two pressure sensors, the first pressure sensor and the second pressure sensor, wherein the first pressure sensor is provided on a circuit board; due to the first pressure sensor is close to the circuit board, the first pressure sensor is not easily disturbed. The second pressure sensor reads data through a I²C bus and sends data to a host through I²C communication; due to the use of the I²C bus for long-distance communication, the external motor harmonics are easily transmitted to the I²C bus through a wire, and the spatial radiation and harmonics cause the failure of the long-distance end to read the pressure, thereby causing the interface to fail. Therefore, due to the lack of stability of the height difference measurement product when measuring pressure, the accuracy of the pressure reading value of the current height difference measurement product is low.

SUMMARY OF THE INVENTION

To address the problems mentioned hereinabove, the invention provides a method and a device for improving the stability of height difference measurement based on a corrugated tube. This method and device can ensure the stability of the height difference measuring product when measuring pressure, thereby improving the accuracy of the pressure reading value of the current height difference measuring product.

In the first aspect, the invention provides a method for improving the stability of height difference measurement based on a corrugated tube, comprising:

utilizing the preset corrugated tube to improve the structural stability of a height difference measuring device between a first pressure sensor and a second pressure sensor, obtaining the structural stability improvement result;

collecting a first pressure from the first pressure sensor, detecting whether the first pressure is affected by external interference; when the first pressure is not affected by external interference, performing pressure screening on the first pressure to obtain a screening pressure, and calculating a first pressure average value of the screening pressure;

collecting a second pressure from the second pressure sensor, calculating a second pressure average value of the second pressure; based on a historical pressure average value of the second pressure sensor, detecting the pressure accuracy of the second pressure average value; when the pressure accuracy is accurate, updating the second pressure by utilizing the second pressure average value to obtain an updated pressure;

based on the first pressure average value and the updated pressure, calculating the dynamic height difference of the height difference measuring device, utilizing the dynamic height difference to determine the dynamic stability improvement result of the height difference measuring device;

combining the structural stability improvement result with the dynamic stability improvement result to determine the final stability improvement result of the height difference measurement device.

In a possible implementation of the first aspect, utilizing the preset corrugated tube to improve the structural stability of the height difference measuring device between the first pressure sensor and the second pressure sensor, obtaining the structural stability improvement result, comprising:

determining outer metal of the height difference measurement device, wherein the outer metal comprises metal covers and a metal braided mesh tube;

configuring the metal braided mesh tube between the first pressure sensor and the second pressure sensor, and configuring the metal covers at the first pressure sensor and the second pressure sensor respectively to obtain a height difference measurement device configured with the outer metal;

when the second pressure sensor is affected by external interference, using the second pressure sensor as a susceptible interference sensor;

combining the corrugated tube and the susceptible interference sensor in the height difference measurement device configured with the outer metal to obtain a structural stability improvement device, and using the structural stability improvement device as the result of the structural stability improvement.

In a possible implementation of the first aspect, the first pressure collected by the first pressure sensor, comprising:

collecting the pressure of the first pressure sensor through the serial bus of the height difference measurement device corresponding to the first pressure sensor, until the pressure collection times meet the preset times to obtain a first pressure sequence;

performing sequence bubble sorting on the first pressure sequence to obtain the first pressure.

In a possible implementation of the first aspect, detecting whether the first pressure is affected by external interference, comprising:

checking whether each first pressure in the first pressure is zero value;

when each first pressure in the first pressure is zero value, the first pressure is affected by external interference;

when each first pressure in the first pressure is not zero value, the first pressure is not affected by external interference.

In a possible implementation of the first aspect, performing pressure screening on the first pressure to obtain the screening pressure, comprising:

checking whether there is any invalid pressure in the first pressure;

when there is an invalid pressure in the first pressure, removing the ineffective pressure from the first pressure to obtain an initial screening pressure;

removing head and tail pressure from the initial screening pressure to obtain a first screening pressure;

when there is no invalid pressure in the first pressure, extracting an intermediate pressure from the first pressure to obtain a second screening pressure.

In a possible implementation of the first aspect, calculating the first pressure average value of the screening pressure, comprising:

calculating the pressure sum of the screening pressure by utilizing the following formula:

$$\text{sum} = \sum_{i=3}^{n-2} x_i (i = 3, 4, 5 \ldots, n) \text{ and } (n > 4)$$

wherein, sum refers to the pressure sum, xi refers to the screening pressure, i refers to the serial number of each pressure in the screening pressure, n refers to the total number of all pressure in the screening pressure;

based on the pressure sum, calculating the first pressure average value by utilizing the following formula:

$$avr = \frac{\text{sum}}{n-4}$$

wherein, avr refers to the first pressure average value, sum refers to the pressure sum, n refers to the total number of all pressure in the screening pressure.

In a possible implementation of the first aspect, based on a historical pressure average value of the second pressure sensor, detecting the pressure accuracy of the second pressure average value, comprising:

calculating the pressure difference between the historical pressure average value and the second pressure average value;

when the pressure difference exceeds the preset difference range, taking the inaccuracy as the pressure accuracy of the second pressure average value;

when the pressure difference does not exceeds the preset difference range, taking the accuracy as the pressure accuracy of the second pressure average value.

In a possible implementation of the first aspect, based on the first pressure average value and the updated pressure, calculating the dynamic height difference of the height difference measuring device, comprising:

collecting a gravitational acceleration of the height difference measurement device;

based on the first pressure average value, the updated pressure, and the gravitational acceleration, calculating the dynamic height difference of the height difference measurement device by utilizing the following formula:

$$h = \frac{p_2 - p_1}{\rho g}$$

wherein, h refers to the dynamic height difference, $p_2$ refers to the first pressure average value, $p_1$ refers to the updated pressure, $\rho$ refers to the pressure density, with a value of 0.93 gram per cubic centimeter, g refers to the gravitational acceleration, with a value of 9.8 meter per quadratic second.

In a possible implementation of the first aspect, utilizing the dynamic height difference to determine the dynamic stability improvement result of the height difference measuring device, comprising:

collecting the current acceleration of the sensor corresponding to the dynamic height difference;

utilizing the current acceleration of the sensor to calculate three-dimensional angle values of the height difference measurement device;

based on the three-dimensional angle values, performing angle correction on the pressure sensor of the height difference measurement device to obtain an angle-corrected pressure sensor, and using the angle-corrected pressure sensor as the dynamic stability improvement result.

In the second aspect, the invention provides a device for improving the stability of height difference measurement based on the corrugated tube, comprising:

a structural improvement module, used to utilize the preset corrugated tube to improve the structural stability of the height difference measuring device between the first pressure sensor and the second pressure sensor, obtaining the structural stability improvement result;

a mean calculation module, used to collect the first pressure from the first pressure sensor, detect whether the first pressure is affected by external interference; when the first pressure is not affected by external interference, performing pressure screening on the first pressure to obtain the screening pressure, and calculating the first pressure average value of the screening pressure;

a pressure update module, used to collect the second pressure from the second pressure sensor, calculate the second pressure average value of the second pressure; based on the historical pressure average value of the second pressure sensor, detecting the pressure accuracy of the second pressure average value; when the pressure accuracy is accurate, updating the second pressure by utilizing the second pressure average value to obtain the updated pressure;

a result determination module, used to combine the structural stability improvement result with the dynamic stability improvement result, and determine the final stability improvement result of the height difference measurement device.

Compared with the prior art, the technical principle and beneficial effects of this solution are as follows:

the embodiments of the invention firstly improve the structural stability of the height difference measuring device between the first pressure sensor and the second pressure sensor by utilizing the preset corrugated tube, in order to reduce the pressure change amplitude of the pressure sensor by utilizing the characteristic of the expansion and contraction length of the corrugated tube, and ensure stable pressure measurement; the embodiments of the invention collect the first pressure of the first pressure sensor for data screening, eliminating inaccurate data caused by unstable measurement; further, the embodiments of the invention detect whether the first pressure is affected by external interference, in order to perform stability testing on the pressure data collected by the I²C bus from the pressure sensor, and detect whether the collected pressure data is incorrect data collected when disturbed; further, the embodiments of the invention calculate the first pressure average value of the screening pressure to classify the sequence of multiple collected pressure data into one final pressure value; further, the embodiments of the invention collect the second pressure of the second pressure sensor for screening pressure data collected in stable scenarios from the second pressure; further, based on the historical pressure average value of the second pressure sensor, the embodiments of the invention detect the pressure accuracy of the second pressure average value, in order to detect whether the measured pressure average value changes too much compared to the historical average value, and detect whether the pressure measurement is disturbed, thereby removing the influence of external interference in the subsequent process and ensuring the accuracy of the measured average value; further, the embodiments of the invention update the second pressure by utilizing the second pressure average value based on the accuracy of the pressure to obtain the updated pressure, in order to replace the original collected pressure data with average value data that eliminate instability, ensuring the stability of pressure measurement data; therefore, the method and device for improving the stability of height difference measurement based on the corrugated tube proposed by the embodiments of the invention can ensure the stability of height difference products during pressure measurement, thereby improving the accuracy of pressure reading values for current height difference products.

BRIEF DESCRIPTION OF ACCOMPANY DRAWINGS

The accompanying drawings are incorporated into the specification and form a part thereof, illustrating embodiments in accordance with the invention and used together with the specification to explain the principles of the invention.

To make the technical solutions provided by the invention or the prior art more comprehensible, a brief description of accompanying drawings required in the embodiments or the prior art is given hereinafter. Apparently, for ordinary technical personnel in the art, other relevant drawings can be obtained based on these drawings without creative labor.

FIG. 1 is a flowchart of the method for improving the stability of the height difference measurement based on the corrugated tube provided in an embodiment of the invention;

SPECIFIC EMBODIMENT OF THE INVENTION

Figure 2:
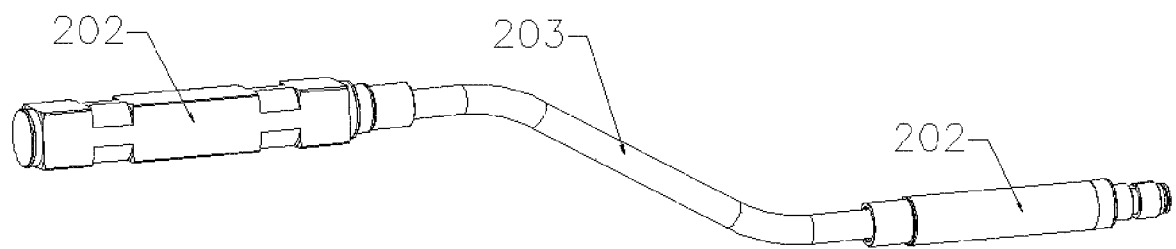
FIG. 2 is a schematic diagram of the height difference measuring device of the method for improving the stability of the height difference measurement based on the corrugated tube of FIG. 1 provided in an embodiment of the invention.

It should be understood that the specific embodiments described herein are only used to explain the invention and are not intended to limit the invention.

The embodiments of the invention provide the method for improving the stability of height difference measurement based on the corrugated tube; wherein the executing subject of the method for improving the stability of height difference measurement based on the corrugated tube includes but is not limited to at least one electronic device of a server or a terminal that can be configured to execute the method provided in the embodiments of the invention. In other words, the method for improving the stability of height difference measurement based on the corrugated tube can be executed by software or hardware installed on terminal devices or server devices, and the software can be a blockchain platform. The server includes but is not limited to: a single server, a server cluster, a cloud server, or a cloud server cluster. The server can be an independent server, or the server can be a cloud server that provide for basic cloud computing services, such as cloud services, cloud databases, cloud computing, cloud functions, cloud storage, network services, cloud communication, middleware services, domain name services, security services, Content Delivery Network (CDN), as well as big data and artificial intelligence platforms.

Figure 3:
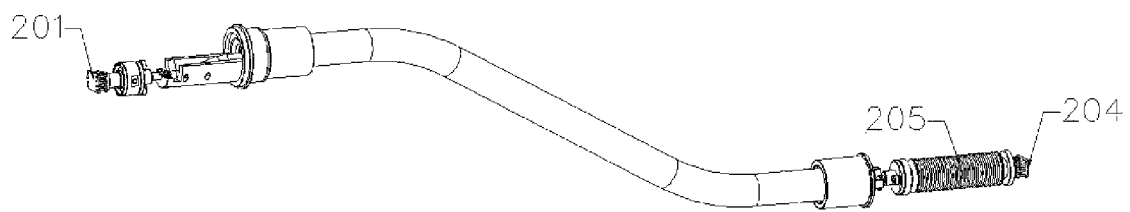
FIG. 3 is an another schematic diagram of the height difference measuring device of the method for improving the stability of the height difference measurement based on the corrugated tube of FIG. 1 provided in an embodiment of the invention.
Figure 4:
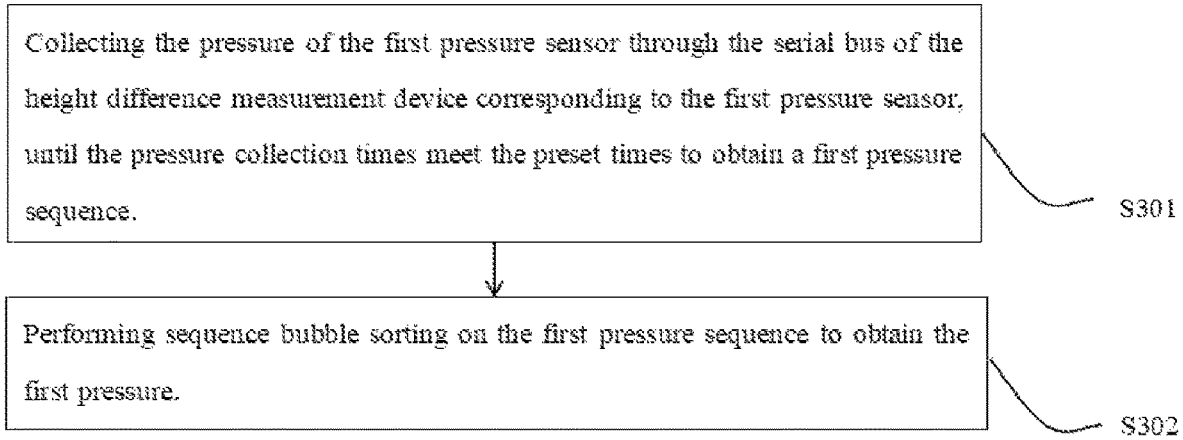
FIG. 4 is a flowchart of the another step of the method for improving the stability of the height difference measurement based on the corrugated tube provided in an embodiment of the invention.

Referring to FIG. 1, it is a flowchart of the method for improving the stability of the height difference measurement based on the corrugated tube provided in an embodiment of the invention, wherein the method for improving the stability of the height difference measurement based on the corrugated tube provided in FIG. 1, comprising:

S1. utilizing the preset corrugated tube to improve the structural stability of a height difference measuring device between a first pressure sensor and a second pressure sensor, obtaining the structural stability improvement result;

the embodiments of the invention firstly improve the structural stability of the height difference measuring device between the first pressure sensor and the second pressure sensor by utilizing the preset corrugated tube, in order to reduce the pressure change amplitude of the pressure sensor by utilizing the characteristic of the expansion and contraction length of the corrugated tube, and ensure stable pressure measurement;

wherein, the corrugated pipe has the characteristic of extending and contracting its own length; the corrugated pipe can buffer changes in pressure and reduce pressure changes by extending and contracting its own length; for example, during the process of raising or lowering the height of the pressure sensor, the length of the corrugated pipe can be extended or contracted to offset pressure changes; if the corrugated pipe at that end does not exist, it will cause excessive changes in the numerical value of the pressure sensor during dynamic measurement, indicating that the pressure sensor is affected by external interference, thereby causing inaccurate height calculation results when using pressure to calculate height; the first pressure sensor and the second pressure sensor are the same sensor, however they are placed in different positions, one at a high place and the other at a low place; the current height difference can be detected through the pressure difference between the high pressure sensor and low pressure sensor, thus forming the height difference measuring device;

in an embodiment of the invention, utilizing the preset corrugated tube to improve the structural stability of the height difference measuring device between the first pressure sensor and the second pressure sensor, obtaining the structural stability improvement result, comprising: determining outer metal of the height difference measurement device, wherein the outer metal comprises metal covers and a metal braided mesh tube; configuring the metal braided mesh tube between the first pressure sensor and the second pressure sensor, and configuring the metal covers at the first pressure sensor and the second pressure sensor respectively to obtain a height difference measurement device configured with the outer metal; when the second pressure sensor is affected by external interference, using the second pressure sensor as a susceptible interference sensor; combining the corrugated tube and the susceptible interference sensor in the height difference measurement device configured with the outer metal to obtain a structural stability improvement device, and using the structural stability improvement device as the result of the structural stability improvement;

exemplarily, the entire height difference measurement product is surrounded by metal (that is, the metal covers at both ends and the metal braided mesh tube in the middle) to form a shield, effectively preventing space radiation from entering the circuit board; since the corrugated pipe has a buffering property, during the process of raising or lowering the height of the pressure sensor, the length of the corrugated pipe can be extended or contracted to offset pressure changes; if the corrugated pipe at that end does not exist, it will cause excessive changes in the numerical value of the pressure sensor during dynamic measurement, thereby causing inaccurate height calculation results; therefore, the corrugated pipe and the second pressure sensor need to be combined and spliced;

referring to FIG. 2, it is a schematic diagram of the height difference measuring device of the method for improving the stability of the height difference measurement based on the corrugated tube of FIG. 1 provided in an embodiment of the invention; in FIG. 2, 202 refers to the metal covers, 203 refers to the metal braided mesh tube;

referring to FIG. 3, it is an another schematic diagram of the height difference measuring device of the method for improving the stability of the height difference measurement based on the corrugated tube of FIG. 1 provided in an embodiment of the invention; in FIG. 3, 201 refers to the first pressure sensor, 204 refers to the second pressure sensor, 205 refers to the corrugated tube; the first pressure sensor and the second pressure sensor are connected through the metal braided mesh tube, the metal covers are wrapped around the first pressure sensor and the second pressure sensor to prevent external interference to the pressure sensor; due to the vibration of the middle pipeline during dynamic pressure measurement, thereby affecting the second pressure sensor, however the first pressure sensor has little effect; therefore, the corrugated tube is added in front of the second pressure sensor to reduce the error caused by the swing during the lifting process of the product;

S2. collecting a first pressure from the first pressure sensor, detecting whether the first pressure is affected by external interference; when the first pressure is not affected by external interference, performing pressure screening on the first pressure to obtain a screening pressure, and calculating a first pressure average value of the screening pressure;

in an embodiment of the invention, before collecting the first pressure from the first pressure sensor, also comprising: the height difference measuring device corresponding to the first pressure sensor is powered on to obtain a power-on starting device; a single chip microcomputer and peripherals in the power-on starting device are initialized to obtain an initialized height difference measuring device;

the embodiments of the invention collect the first pressure of the first pressure sensor to perform data screening on the first pressure, thereby eliminating inaccurate data caused by unstable measurement;

in an embodiment of the invention, referring to FIG. 4, collecting the first pressure from the first pressure sensor, comprising:

S301. collecting the pressure of the first pressure sensor through the serial bus of the height difference measurement device corresponding to the first pressure sensor, until the pressure collection times meet the preset times to obtain a first pressure sequence;

S302. performing sequence bubble sorting on the first pressure sequence to obtain the first pressure;

optionally, the process of collecting the pressure of the first pressure sensor through the serial bus of the height difference measurement device corresponding to the first pressure sensor can be achieved by collecting through the I$^2$C bus;

further, the embodiments of the invention detect whether the first pressure is affected by external interference, in order to perform stability testing on the pressure data collected by the I$^2$C bus from the pressure sensor, and detect whether the collected pressure data is incorrect data collected when disturbed;

in an embodiment of the invention, detecting whether the first pressure is affected by external interference, comprising: checking whether each first pressure in the first pressure is zero value; when each first pressure in the first pressure is zero value, the first pressure is affected by external interference; when each first pressure in the first pressure is not zero value, the first pressure is not affected by external interference;

optionally, when the first pressure is disturbed by external interference, the pressure data collected through the I$^2$C bus has no reference value, therefore there is no need to use the collected data to update the historical pressure data stored in the system at this time;

in an embodiment of the invention, performing pressure screening on the first pressure to obtain the screening pressure, comprising checking whether there is any invalid pressure in the first pressure; when there is an invalid pressure in the first pressure, removing the ineffective pressure from the first pressure to obtain an initial screening pressure; removing head and tail pressure from the initial screening pressure to obtain a first screening pressure; when there is no invalid pressure in the first pressure, extracting an intermediate pressure from the first pressure to obtain a second screening pressure;

wherein, the invalid pressure refers to a pressure with a value of zero; exemplarily, the process of removing the head and tail pressure from the initial screening pressure to obtain the first screening pressure refers to the process of removing the head and tail data; the process of extracting the middle pressure in the first pressure is similar to the principle of removing the head and tail pressure in the initial screening pressure to obtain the first screening pressure, and will not be further described here;

further, the embodiments of the invention calculate the first pressure average value of the screening pressure to classify the sequence of multiple collected pressure data into one final pressure value;

in an embodiment of the invention, calculating the first pressure average value of the screening pressure, comprising: calculating the pressure sum of the screening pressure by utilizing the following formula:

$$\text{sum} = \sum_{i=3}^{n-2} x_i (i = 3, 4, 5 \ldots, n) \text{ and } (n > 4)$$

wherein, sum refers to the pressure sum, xi refers to the screening pressure, i refers to the serial number of each pressure in the screening pressure, n refers to the total number of all pressure in the screening pressure;

based on the pressure sum, calculating the first pressure average value by utilizing the following formula:

$$avr = \frac{\text{sum}}{n-4}$$

wherein, avr refers to the first pressure average value, sum refers to the pressure sum, n refers to the total number of all pressure in the screening pressure;

S3. collecting a second pressure from the second pressure sensor, calculating a second pressure average value of the second pressure; based on a historical pressure average value of the second pressure sensor, detecting the pressure accuracy of the second pressure average value; when the pressure accuracy is accurate, updating the second pressure by utilizing the second pressure average value to obtain an updated pressure;

the embodiments of the invention collect the second pressure from the second pressure sensor, in order to screen pressure data collected in stable scenarios from the second pressure;

in an embodiment of the invention, the principle of collecting the second pressure of the second pressure sensor is similar to the principle of collecting the first pressure of the first pressure sensor mentioned hereinabove, and no further screening is performed here;

in an embodiment of the invention, the principle of calculating the second pressure average value for the second pressure is similar to the principle of detecting whether the first pressure is affected by external interference; when the first pressure is not affected by external interference, performing pressure screening on the first pressure to obtain a screening pressure, and calculating a first pressure average value of the screening pressure, and will not be further described here;

further, based on a historical pressure average value of the second pressure sensor, the embodiments of the invention detect the pressure accuracy of the second pressure average value, in order to detect whether the measured pressure average value changes too much compared to the historical average value, and detect whether the pressure measurement is disturbed, thereby removing the influence of external interference in the subsequent process and ensuring the accuracy of the measured average value;

in an embodiment of the invention, based on a historical pressure average value of the second pressure sensor, detecting the pressure accuracy of the second pressure average value, comprising: calculating the pressure difference between the historical pressure average value and the second pressure average value; when the pressure difference exceeds the preset difference range, taking the inaccuracy as the pressure accuracy of the second pressure average value; when the pressure difference does not exceeds the preset difference range, taking the accuracy as the pressure accuracy of the second pressure average value;

wherein, the preset difference range can be set to ±0.1 Kilopascal or adjusted according to the actual scenario;

further, the embodiments of the invention update the second pressure by utilizing the second pressure average value based on the accuracy of the pressure when the pressure accuracy is accurate, in order to replace the original collected pressure data with average value data that eliminate instability, ensuring the stability of pressure measurement data;

in an embodiment of the invention, when the pressure accuracy is accurate, updating the second pressure by utilizing the second pressure average value to obtain an updated pressure, comprising: achieving by replacing the second pressure with the second pressure average value;

S4. based on the first pressure average value and the updated pressure, calculating the dynamic height difference of the height difference measuring device, utilizing the dynamic height difference to determine the dynamic stability improvement result of the height difference measuring device;

in an embodiment of the invention, based on the first pressure average value and the updated pressure, calculating the dynamic height difference of the height difference measuring device, comprising: collecting a gravitational acceleration of the height difference measurement device; based on the first pressure average value, the updated pressure, and the gravitational acceleration, calculating the dynamic height difference of the height difference measurement device by utilizing the following formula:

$$h = \frac{p_2 - p_1}{\rho g}$$

wherein, h refers to the dynamic height difference, $p_2$ refers to the first pressure average value, $p_1$ refers to the updated pressure, $\rho$ refers to the pressure density, with a value of 0.93 gram per cubic centimeter, g refers to the gravitational acceleration, with a value of 9.8 meter per quadratic second;

in an embodiment of the invention, utilizing the dynamic height difference to determine the dynamic stability improvement result of the height difference measuring device, comprising: collecting the current acceleration of the sensor corresponding to the dynamic height difference; utilizing the current acceleration of the sensor to calculate three-dimensional angle values of the height difference measurement device; based on the three-dimensional angle values, performing angle correction on the pressure sensor of the height difference measurement device to obtain an angle-corrected pressure sensor, and using the angle-corrected pressure sensor as the dynamic stability improvement result;

S5. combining the structural stability improvement result with the dynamic stability improvement result to determine the final stability improvement result of the height difference measurement device.

It can be seen that the embodiments of the invention firstly improve the structural stability of the height difference measuring device between the first pressure sensor and the second pressure sensor by utilizing the preset corrugated tube, in order to reduce the pressure change amplitude of the pressure sensor by utilizing the characteristic of the expansion and contraction length of the corrugated tube, and ensure stable pressure measurement; the embodiments of the invention collect the first pressure of the first pressure sensor for data screening, eliminating inaccurate data caused by unstable measurement; further, the embodiments of the invention detect whether the first pressure is affected by external interference, in order to perform stability testing on the pressure data collected by the $I^2C$ bus from the pressure sensor, and detect whether the collected pressure data is incorrect data collected when disturbed; further, the embodiments of the invention calculate the first pressure average value of the screening pressure to classify the sequence of multiple collected pressure data into one final pressure value; further, the embodiments of the invention collect the second pressure of the second pressure sensor for screening pressure data collected in stable scenarios from the second pressure; further, based on the historical pressure average value of the second pressure sensor, the embodiments of the invention detect the pressure accuracy of the second pressure average value, in order to detect whether the measured pressure average value changes too much compared to the historical average value, and detect whether the pressure measurement is disturbed, thereby removing the influence of external interference in the subsequent process and ensuring the accuracy of the measured average value; further, the embodiments of the invention update the second pressure by utilizing the second pressure average value based on the accuracy of the pressure to obtain the updated pressure, in order to replace the original collected pressure data with average value data that eliminate instability, ensuring the stability of pressure measurement data; therefore, the method and device for improving the stability of height difference measurement based on the corrugated tube proposed by the embodiments of the invention can ensure the stability of height difference products during pressure measurement, thereby improving the accuracy of pressure reading values for current height difference products.

Figure 5:
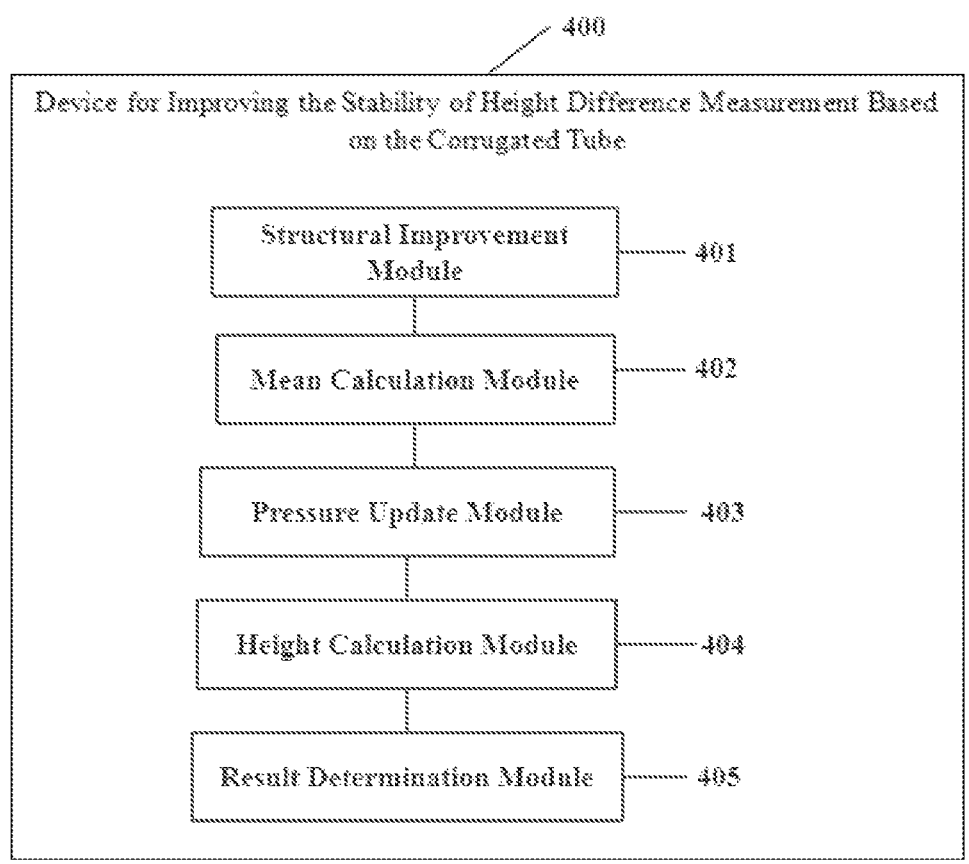
FIG. 5 is a module schematic diagram of the device for improving the stability of height difference measurement based on the corrugated tube provided in an embodiment of the invention.

As shown in FIG. 5, it is a functional module diagram of the device for improving the stability of height difference measurement based on the corrugated tube of the invention.

The device 400 for improving the stability of height difference measurement based on the corrugated tube can be provided in the electronic device. According to the functions to be implemented, the device for improving the stability of height difference measurement based on the corrugated tube can comprise a structure improvement module 401, a mean value calculation module 402, a pressure update module 403, a height calculation module 404 and a result determination module 405. The modules of the invention can also be referred to as units, which refers to a series of computer program segments that can be executed by processors of the electronic device and can complete fixed functions, and the modules are stored in a memory of the electronic device.

In the embodiments of the invention, the functions of each module/unit are as follows:

a structural improvement module 401, used to utilize the preset corrugated tube to improve the structural stability of the height difference measuring device between the first pressure sensor and the second pressure sensor, obtaining the structural stability improvement result;

a mean calculation module 402, used to collect the first pressure from the first pressure sensor, detect whether the first pressure is affected by external interference; when the first pressure is not affected by external interference, performing pressure screening on the first pressure to obtain the screening pressure, and calculating the first pressure average value of the screening pressure;

a pressure update module 403, used to collect the second pressure from the second pressure sensor, calculate the second pressure average value of the second pressure; based on the historical pressure average value of the second pressure sensor, detecting the pressure accuracy of the second pressure average value; when the pressure accuracy is accurate, updating the second pressure by utilizing the second pressure average value to obtain the updated pressure;

a height calculation module, used to calculate the dynamic height difference of the height difference measuring device based on the first pressure average value and the updated pressure, utilize the dynamic height difference to determine the dynamic stability improvement result of the height difference measuring device;

a result determination module, used to combine the structural stability improvement result with the dynamic stability improvement result, and determine the final stability improvement result of the height difference measurement device.

In detail, the modules in the device 400 for improving the stability of height difference measurement based on the corrugated tube described in the embodiments of the invention adopt the same technical means as the method for improving the stability of height difference measurement based on the corrugated tube described in the FIG. 1 to FIG. 4 mentioned hereinabove when in use, and can produce the same technical effects, and will not be further described here.

Figure 6:
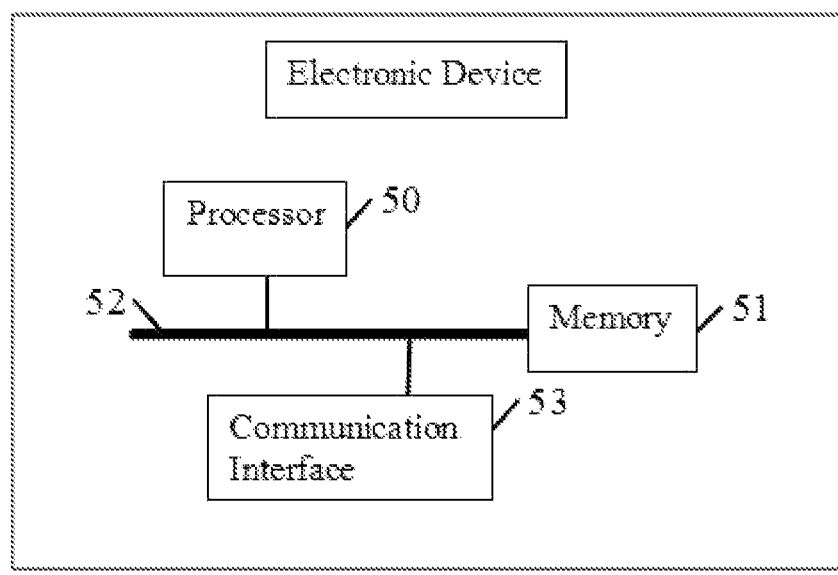
FIG. 6 is an inner schematic diagram of the internal structure of an electronic device of the method for improving the stability of height difference measurement based on the corrugated tube provided in an embodiment of the invention.

As shown in FIG. 6, it is a schematic diagram of the internal structure of the electronic device of the method for improving the stability of height difference measurement based on the corrugated tube of the invention.

The electronic device can comprise the processors 50, the memory 51, a communication bus 52 and a communication interface 53, and can also comprise a computer program stored in the memory 51 and executable on the processors 50, such as a stability improvement program based on the height difference measurement of the corrugated tube.

Wherein, the processors 50 can be composed of integrated circuits in some embodiments, for example, a single packaged integrated circuit, or a plurality of packaged integrated circuits with the same or different functions, comprising one or more central processing units (CPUs), microprocessors, digital processing chips, graphics processors, and combinations of various control chips and so on. The processors 50 are the control unit (Control Unit) of the electronic device, using various interfaces and circuits to connect various components of the entire electronic device, executing various functions and process data of the electronic device by running or executing programs or modules stored in the memory 51 (for example, executing the stability improvement program based on the height difference measurement of the corrugated tube and so on), and calling data stored in the memory 51.

The memory 51 comprises at least one type of readable storage medium, and the readable storage medium comprises a flash memory, a mobile hard disk, a multimedia card, a card-type memory (such as SD or DX memory and so on), a magnetic memory, a disk, an optical disk and so on. The memory 51 can be an internal storage unit of the electronic device in some embodiments, such as a mobile hard disk of the electronic device. The memory 51 can also be an external storage device of the electronic device in other embodiments, such as a plug-in mobile hard disk, a smart media card (Smart Media Card, SMC), a secure digital (Secure Digital, SD) card, a flash card, and so on provided on the electronic device. Further, the memory 51 can also comprise both an internal storage unit of the electronic device and an external storage device. The memory 51 can not only be used to store application software and various types of data installed in the electronic device, such as the code of the database configuration connection program, but also can be used to temporarily store data that has been output or will be output.

The communication bus 52 can be a peripheral component interconnect (PCI) bus or an extended industry standard architecture (EISA) bus and so on. The bus can be divided into an address bus, a data bus, a control bus and so on. The bus is configured to realize connection and communication between the memory 51 and at least one processor 50 and so on.

The communication interface 53 is used for communication between the electronic device 5 and other devices, comprising a network interface and a user interface. Optionally, the network interface can comprise a wired interface and/or a wireless interfaces (such as a WI-FI interface, a Bluetooth interface and so on), typically used to establish communication connections between the electronic device and other electronic devices. The user interface can be a display, an input unit (such as a keyboard). Optionally, the user interface can also be a standard wired interface or a wireless interface. Optionally, in some embodiments, the display can be an Light Emitting Diode display, a liquid crystal display, a touch sensitive liquid crystal display, and an OLED (Organic Light Emitting Diode) touch sensor and so on. Wherein, the display can also be appropriately referred to as a screen or a display unit, used to display the information processed in the electronic device and to display the visual user interface.

FIG. 6 only shows the electronic device with components. Those skilled in the art should understand that the structure shown in FIG. 6 does not limit the electronic device, and can comprise fewer or more components than shown, or combine certain components, or different component arrangements.

For example, although not shown, the electronic device can also comprise a power source (such as a battery) for supplying power to various components. Preferably, the power source can be logically connected to the at least one processor 50 through a power management device, so that the power management device can realize functions such as charging management, discharging management, and power consumption management. The power source can also comprise any components such as one or more direct-current or alternating current power sources, recharging devices, power failure detection circuits, power converters or inverters, and power status indicators. The electronic device can also comprise a variety of sensors, Bluetooth modules, Wi-Fi modules and so on, and will not be further described here.

It should be understood that the embodiments are for illustrative purposes only and the scope of the invention is not limited to this structure.

A database configuration connection program stored in the memory 51 in the electronic device is a combination of multiple computer programs. When running in the processors 50, the database configuration connection program can achieve:

utilizing the preset corrugated tube to improve the structural stability of a height difference measuring device between a first pressure sensor and a second pressure sensor, obtaining the structural stability improvement result;

collecting a first pressure from the first pressure sensor, detecting whether the first pressure is affected by external interference; when the first pressure is not affected by external interference, performing pressure screening on the first pressure to obtain a screening pressure, and calculating a first pressure average value of the screening pressure;

collecting a second pressure from the second pressure sensor, calculating a second pressure average value of the second pressure; based on a historical pressure average value of the second pressure sensor, detecting the pressure accuracy of the second pressure average value; when the pressure accuracy is accurate, updating the second pressure by utilizing the second pressure average value to obtain an updated pressure;

based on the first pressure average value and the updated pressure, calculating the dynamic height difference of the height difference measuring device, utilizing the dynamic height difference to determine a dynamic stability improvement result of the height difference measuring device;

combining the structural stability improvement result with the dynamic stability improvement result to determine the final stability improvement result of the height difference measurement device.

Specifically, the specific implementation method of the processors 50 for the computer program mentioned hereinabove can refer to the description of the relevant steps in the corresponding embodiment of FIG. 1, and will not be further described here.

Further, if the module/unit integrated in the electronic device is implemented in the form of a software functional unit and sold or used as an independent product, it can be stored in a non-volatile computer-readable storage medium. The storage medium can be volatile or non-volatile. For example, the computer-readable medium can comprise: any entity or device capable of carrying the computer program code, a recording medium, a USB flash drive, a mobile hard disk, a magnetic disk, an optical disk, a computer memory, and a read-only memory (ROM).

The invention further provides the storage medium, wherein the readable storage medium stores the computer program, and when the computer program is executed by the processors of the electronic device, the computer program can achieve:

utilizing the preset corrugated tube to improve the structural stability of a height difference measuring device between a first pressure sensor and a second pressure sensor, obtaining the structural stability improvement result;

collecting a first pressure from the first pressure sensor, detecting whether the first pressure is affected by external interference; when the first pressure is not affected by external interference, performing pressure screening on the first pressure to obtain a screening pressure, and calculating a first pressure average value of the screening pressure;

collecting a second pressure from the second pressure sensor, calculating a second pressure average value of the second pressure; based on a historical pressure average value of the second pressure sensor, detecting the pressure accuracy of the second pressure average value; when the pressure accuracy is accurate, updating the second pressure by utilizing the second pressure average value to obtain an updated pressure;

based on the first pressure average value and the updated pressure, calculating the dynamic height difference of the height difference measuring device, utilizing the dynamic height difference to determine a dynamic stability improvement result of the height difference measuring device;

combining the structural stability improvement result with the dynamic stability improvement result to determine the final stability improvement result of the height difference measurement device.

In the several embodiments provided by the invention, it should be understood that the disclosed devices, apparatuses and methods can be implemented in other ways. For example, the device embodiments mentioned hereinabove are only schematic; for example, the division of the modules is only a logical function division, and there may be other division methods in actual implementation.

The modules described as separate components can or can not be physically separated, and the components shown as modules can or can not be physical units, that is, they can be located in one place or distributed on multiple network units. Some or all of the modules may be selected according to actual needs to achieve the purpose of the solution of the embodiments.

In addition, each functional module in each embodiment of the invention may be integrated into one processing unit, or each unit may exist physically separately, or two or more units may be integrated into one unit. The integrated unit mentioned hereinabove may be implemented in the form of hardware or in the form of hardware plus software functional modules.

It is obvious to those skilled in the art that the invention is not limited to the details of the exemplary embodiments mentioned hereinabove, and that the invention can be implemented in other specific forms without departing from the spirit or essential characteristics of the invention.

Therefore, no matter from which point of view, the embodiments should be regarded as illustrative and non-restrictive, and the scope of the invention is limited by the appended claims rather than the description mentioned hereinabove, therefore, it is intended that all changes falling within the meaning and scope of the equivalent elements of the claims are included in the invention. Any attached figure mark in the claims should not be regarded as limiting the claims involved.

It needs to be explained that relational terms such as "first" and "second" are used merely to distinguish one entity or action from another entity or action without necessarily requiring or implying any actual such relationship or order between them. Moreover, the terms "comprising," "including," or any other variations thereof are intended to cover a non-exclusive inclusion, such that a process, method, article, or apparatus that comprises a list of elements does not only include those elements, but also includes other elements not explicitly listed, or further includes elements inherent to such a process, method, article, or apparatus. Without further limitation, an element defined by the statement "comprises a . . . " does not exclude the presence of additional identical elements in a process, method, article, or apparatus that includes the stated element.

What mentioned hereinabove are only specific embodiments of the invention, so that those skilled in the art can understand or implement the invention. Various modifications to these embodiments will be apparent to those skilled in the art, and the general principles defined herein may be implemented in other embodiments without departing from the spirit or scope of the invention. Therefore, the invention will not be limited to the embodiments shown herein, however should conform to the widest scope consistent with the principles and novel features invented herein.

The invention claimed is:

1. A method for improving the stability of a height difference measurement based on a corrugated tube, wherein the method comprises:

utilizing the preset corrugated tube to improve the structural stability of a height difference measuring device between a first pressure sensor and a second pressure sensor, obtaining the structural stability improvement result;

collecting a first pressure from the first pressure sensor, detecting whether the first pressure is affected by external interference; when the first pressure is not affected by external interference, performing pressure screening on the first pressure to obtain a screening pressure, and calculating a first pressure average value of the screening pressure;

collecting a second pressure from the second pressure sensor, calculating a second pressure average value of the second pressure; based on a historical pressure average value of the second pressure sensor, detecting the pressure accuracy of the second pressure average value; when the pressure accuracy is accurate, updating the second pressure by utilizing the second pressure average value to obtain an updated pressure;

based on the first pressure average value and the updated pressure, calculating the dynamic height difference of the height difference measuring device, utilizing the dynamic height difference to determine a dynamic stability improvement result of the height difference measuring device;

combining the structural stability improvement result with the dynamic stability improvement result to determine the final stability improvement result of the height difference measurement device;

based on the first pressure average value and the updated pressure, calculating the dynamic height difference of the height difference measuring device, comprising:

collecting a gravitational acceleration of the height difference measurement device;

based on the first pressure average value, the updated pressure, and the gravitational acceleration, calculating the dynamic height difference of the height difference measurement device by utilizing the following formula:

$$h = \frac{p_2 - p_1}{\rho g}$$

wherein, h refers to the dynamic height difference, $p_2$ refers to the first pressure average value, $p_1$ refers to the updated pressure, ρ refers to the pressure density, with a value of 0.93 gram per cubic centimeter, g refers to the gravitational acceleration, with a value of 9.8 meter per quadratic second.

2. The method according to claim 1, wherein utilizing the preset corrugated tube to improve the structural stability of the height difference measuring device between the first pressure sensor and the second pressure sensor, obtaining the structural stability improvement result, comprising:
  determining outer metal of the height difference measurement device, wherein the outer metal comprises metal covers and a metal braided mesh tube;
  configuring the metal braided mesh tube between the first pressure sensor and the second pressure sensor, and configuring the metal covers at the first pressure sensor and the second pressure sensor respectively to obtain a height difference measurement device configured with the outer metal;
  when the second pressure sensor is affected by external interference, using the second pressure sensor as a susceptible interference sensor;
  combining the corrugated tube and the susceptible interference sensor in the height difference measurement device configured with the outer metal to obtain a structural stability improvement device, and using the structural stability improvement device as the result of the structural stability improvement.

3. The method according to the claim 1, wherein the first pressure collected by the first pressure sensor, comprising:
  collecting the pressure of the first pressure sensor through the serial bus of the height difference measurement device corresponding to the first pressure sensor, until the pressure collection times meet the preset times to obtain a first pressure sequence;
  performing sequence bubble sorting on the first pressure sequence to obtain the first pressure.

4. The method according to claim 2, wherein detecting whether the first pressure is affected by external interference, comprising:
  checking whether each first pressure in the first pressure is zero value;
  when each first pressure in the first pressure is zero value, the first pressure is affected by external interference;
  when each first pressure in the first pressure is not zero value, the first pressure is not affected by external interference.

5. The method according to any of claim 1 to claim 4, wherein performing pressure screening on the first pressure to obtain the screening pressure, comprising:
  checking whether there is any invalid pressure in the first pressure;
  when there is an invalid pressure in the first pressure, removing the ineffective pressure from the first pressure to obtain an initial screening pressure;
  removing head and tail pressure from the initial screening pressure to obtain a first screening pressure;
  when there is no invalid pressure in the first pressure, extracting an intermediate pressure from the first pressure to obtain a second screening pressure.

6. The method according to claim 1, wherein calculating the first pressure average value of the screening pressure, comprising:
  calculating the pressure sum of the screening pressure by utilizing the following formula:

$$\text{sum} = \sum_{i=3}^{n-2} x_i (i = 3, 4, 5 \ldots, n) \text{ and } (n > 4)$$

wherein, sum refers to the pressure sum, xi refers to the screening pressure, i refers to the serial number of each pressure in the screening pressure, n refers to the total number of all pressure in the screening pressure;
  based on the pressure sum, calculating the first pressure average value by utilizing the following formula:
  wherein, avr refers to the first pressure average value, sum refers to the pressure sum, n refers to the total number of all pressure in the screening pressure.

7. The method according to claim 6, wherein based on a historical pressure average value of the second pressure sensor, detecting the pressure accuracy of the second pressure average value, comprising:
  calculating the pressure difference between the historical pressure average value and the second pressure average value;
  when the pressure difference exceeds the preset difference range, taking the inaccuracy as the pressure accuracy of the second pressure average value;
  when the pressure difference does not exceeds the preset difference range, taking the accuracy as the pressure accuracy of the second pressure average value.

8. The method according to claim 1, wherein utilizing the dynamic height difference to determine the dynamic stability improvement result of the height difference measuring device, comprising:
  collecting the current acceleration of the sensor corresponding to the dynamic height difference;
  utilizing the current acceleration of the sensor to calculate three-dimensional angle values of the height difference measurement device;
  based on the three-dimensional angle values, performing angle correction on the pressure sensor of the height difference measurement device to obtain an angle-corrected pressure sensor, and using the angle-corrected pressure sensor as the dynamic stability improvement result.

9. A device for improving the stability of height difference measurement based on the corrugated tube, wherein the device comprises:
  a structural improvement module, used to utilize the preset corrugated tube to improve the structural stability of the height difference measuring device between the first pressure sensor and the second pressure sensor, obtaining the structural stability improvement result;
  a mean calculation module, used to collect the first pressure from the first pressure sensor, detect whether the first pressure is affected by external interference; when the first pressure is not affected by external interference, performing pressure screening on the first pressure to obtain the screening pressure, and calculating the first pressure average value of the screening pressure;
  a pressure update module, used to collect the second pressure from the second pressure sensor, calculate the second pressure average value of the second pressure; based on the historical pressure average value of the second pressure sensor, detecting the pressure accuracy of the second pressure average value; when the pressure accuracy is accurate, updating the second pressure by utilizing the second pressure average value to obtain the updated pressure;

a height calculation module, used to calculate the dynamic height difference of the height difference measuring device based on the first pressure average value and the updated pressure, utilize the dynamic height difference to determine the dynamic stability improvement result of the height difference measuring device;

a result determination module, used to combine the structural stability improvement result with the dynamic stability improvement result, and determine the final stability improvement result of the height difference measurement device.

\* \* \* \* \*